INVENTOR.
James T. Zellers, Jr.
BY Nobbe & Swope
ATTORNEYS

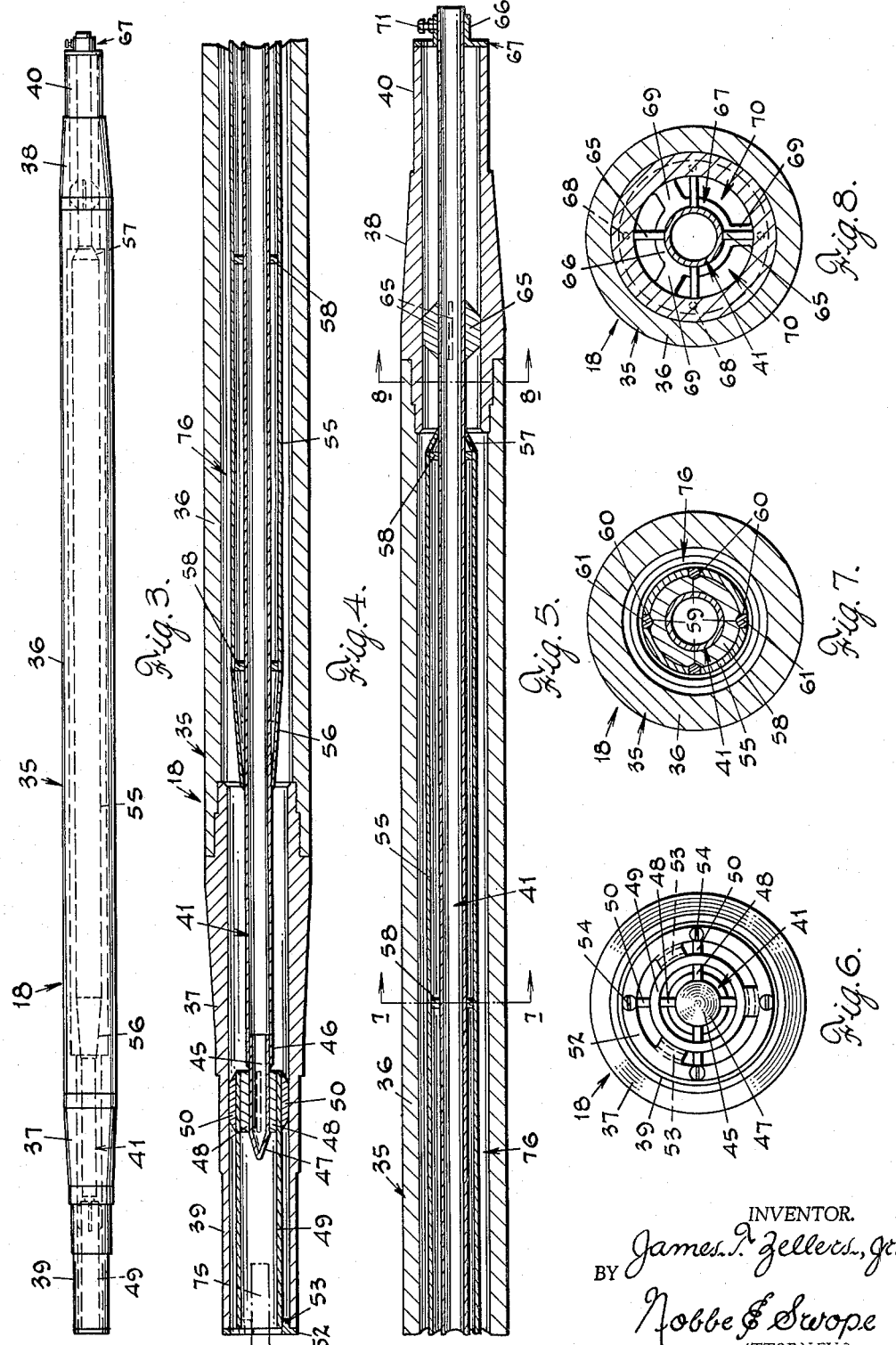

United States Patent Office 3,209,817
Patented Oct. 5, 1965

3,209,817
GLASS SHEET SUPPORT ROLL
James T. Zellers, Jr., Charleston, W. Va., assignor to Libbey-Owens-Ford Glass Company, Toledo, Ohio, a corporation of Ohio
Filed Oct. 23, 1962, Ser. No. 232,384
3 Claims. (Cl. 165—90)

The present invention relates generally to the manufacture of sheet or window glass, and more particularly relates to an improved support roll about which a newly formed glass sheet travels as it is continuously drawn from a pool of molten glass.

The principal object of this invention is to provide a glass sheet support roll having improved means for maintaining the roll at optimum working temperature.

Another object of the invention is to provide a hollow glass sheet support roll including improved means for directing a cooling medium through the interior of the roll to control the temperature of the glass contacting or working surface of the support roll.

A further object of the invention is to provide an elongated hollow glass sheet support roll having means located interiorly thereof for directing a temperature controlling medium along a predetermined path in contact with the inner surface of the roll casing to substantially uniformly absorb heat from the working surface of the roll and thus prevent overheating thereof and the occurrence of hot spots axially therealong while a sheet of relatively hot glass is in contact with such working surface.

Other objects and advantages of the invention will become more apparent during the course of the following description when taken in connection with the accompanying drawings.

In the drawings wherein like numerals are employed to designate like parts throughout the same:

FIG. 3 is an elevational view of the glass supporting roll;

FIG. 4 is a cross sectional view of one end of the support roll;

FIG. 5 is a complementary longitudinal cross sectional view of the opposite end of the support roll;

FIG. 6 is an end view of the support roll looking from the left of FIG. 4;

FIG. 7 is a cross sectional view taken along the line 7—7 of FIG. 5; and

FIG. 8 is a cross sectional view taken along the line 8—8 of FIG. 5.

Figure 1:
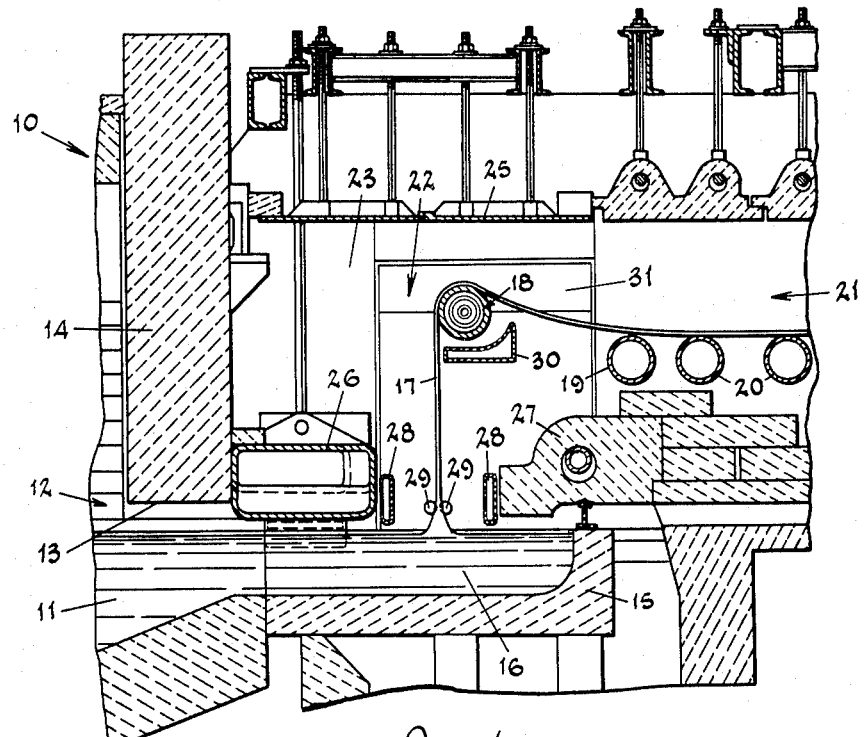
FIG. 1 is a longitudinal, vertical cross sectional view of a sheet glass drawing furnace including a glass supporting roll constructed in accordance with this invention.

With reference now more particularly to the drawings, the numeral 10 designates generally the outlet end of a continuous tank furnace in which a mass of molten glass is provided, refined and cooled to proper working temperature. The molten glass, indicated by the numeral 11, flows from the cooling chamber 12 of the furnace 10 beneath the outlet arch 13 of an end wall 14 and into a working receptacle or draw-pot 15 to form a relatively shallow pool of molten glass 16 from which a sheet or ribbon 17 can be continuously drawn.

Although in no manner restricted thereto, the improved support roll of the present invention is particularly well adapted for use as the "bending" roll in the so-called Colburn type of sheet glass drawing machine, and it will herein be described in that connection. Generally speaking, in drawing machines of the Colburn type, the sheet or ribbon 17 is continuously drawn vertically upwardly from the surface of the pool of molten glass 16 and, while still in a semi-plastic condition although substantially set in its final sheet form, is deflected into the horizontal plane about a support or bending roll, generally designated by the numeral 18, and then passes over an idler roll 19 onto rolls 20 situated in a flattening chamber 21. Although not shown in detail, it is believed to be well known that the glass sheet or ribbon continues in its forward movement into and through a conventional annealing lehr.

The support or bending roll 18 for this purpose is situated in the forming or drawing chamber, generally designated by the numeral 22 and defined by the end furnace wall 14, oppositely disposed side walls 23 and 24 (FIG. 2), and a roof 25. Arranged above the draw-pot 15 are front and rear lip-tiles 26 and 27, respectively, which function to direct any rising currents of hot air or other gases downwardly toward the surface of the molten glass 16 and thereby substantially separate the area immediately above the draw-pot from the drawing chamber 22. The oppositely disposed vertical surfaces of the front and rear lip-tiles also define a working area through which the upwardly drawn sheet or ribbon moves and within this space are provided sheet coolers 28 which, by means of a cooling medium circulated therethrough, reduce the temperature of the air contacting the surfaces of the newly formed sheet. Also, pairs of knurled width maintaining rolls 29 are arranged at the opposite edges of the ribbon 17 to establish the width thereof as it becomes relatively set in sheet form.

The side walls 23 and 24 are provided with suitably sized openings for mounting the bending roll 18, the sheet coolers 28, the pair of knurled rolls 29 and a bending roll cooler 30, such openings being more or less tightly sealed by enclosure panels 31. Outwardly of the wall 23, one end of the roll 18 is journaled in a bearing case 32 suitably supported on the frame structure of the furnace and including conventional gearing adapted to rotatably drive the roll, while the opposite end of the roll passes through the panel 31 of side wall 24 and is carried by a bearing case 33.

The bending roll cooler 30, as viewed in FIG. 1, is positioned beneath the bending roll 18 and functions to shield the lower exposed surface of the roll from the highly heated air currents moving upwardly from the open working area through which the glass ribbon is initially drawn. By reason of the circulation of a coolant through the cooler, the atmosphere adjacent the roll is reduced in temperature which also results in exerting a cooling effect on the roll surface. It is known that this influence of the cooler 30 is effective to some extent in maintaining the roll surface at a desired working temperature. However, it is also known that the bending roll cooler is not, by itself, sufficient to accurately control the roll temperature in the range desired due to the direct contact of the newly formed hot glass ribbon therewith. In this respect, it is believed that the surface condition of the resulting glass sheet, as well as the conditions of the working surface of the roll is influenced by the temperature of the glass and that the surface temperature of the roll, unless properly controlled, in one way or another also deleteriously affects the surface quality of the glass.

Now, it has heretofore been proposed to pass various cooling fluids, e.g., water, through the interior of a hollow bending roll in an attempt to maintain the outer surface thereof at a predetermined working temperature. In this respect, one such proposal includes the employment of a perforated conduit extending through the roll from one end to the other, through which water under pressure is directed. The perforations in the conduit act as a series of nozzles through which the water is expelled or sprayed into contact with the inner surface of the roll casing. While these perforated conduits have been, to some extent, satisfactory in cooling the outer surface, it has been extremely difficult, if not impossible, to uniformly impinge the water (or a compressible fluid such as air) axially along the roll thereby resulting in peripheral areas axially of the roll of somewhat varying temperature. Thus, the existence of relatively cooler and hotter areas longitudinally across the roll can produce variations in the conditioning of the ribbon as it leaves the bending roll and travels toward the flattening chamber. Further, due to the cooling capacity of the cooling medium not remaining constant in its flow longitudinally of the roll casing, that is, the temperature thereof increasing as it travels through the casing due to the absorption of heat from the casing, its cooling effect also varied along the length of the roll.

In order to equalize and/or eliminate the presence of such randomly located hot and cold surface areas and in an endeavor to maintain the working surface of the roll at a uniform, accurately controlled temperature, it is herein contemplated to contact the inner surface of the roll with a freely flowing cooling medium, such as air, which, by its movement under relatively low initial pressure substantially only axially of the roll, is adapted to flow along the inner surface of the roll and equalize the temperature of the working surface in its entirety while simultaneously maintaining the same in the desired working range.

Essentially, the support or bending roll 18 in accordance with the invention comprises an elongated hollow casing 35 having a cylindrical central portion 36 defining the working surface of the roll which contacts the newly formed glass sheet and generally tapered end portions 37 and 38, the outermost surfaces 39 and 40 of which are adapted to be received in the gear and/or bearing devices 32 and 33.

The roll 18 is provided with an elongated tubular member indicated generally at 41 having a cylindrical surface disposed concentrically to the cylindrical centrally disposed portion 36 of the casing 35. Upon reference to FIGS. 4 and 5, it will be seen that the tubular member 41 extends from a point approximately medial the tapered end casing portion 37 completely through and out the opposite end of the casing. The member 41 is closed by a hollow cylindrical plug 45 at its end 46 disposed inwardly of the casing, which plug has a conical outer end portion 47. The cylindrical surface of the plug 45 is equipped with equally spaced apart radial fins 48 (also see FIG. 6) that support the plug in concentric relation with a cylindrical sleeve 49. The sleeve 49 in turn is supported in concentric relation with respect to the surface 39 of the casing by lugs or fins 50 located adjacent its inner end, and a mounting ring 52 equipped with inwardly directed, spaced lugs 53 secured by screws 54 to the casing.

A sleeve 55 is positioned concentrically about the tubular member 41 and extends substantially from one end of the cylindrical central portion 36 of the roll casing 35 to the other end. The sleeve 55 includes tapered end portions 56 and 57 which are affixed at their axially outermost extremities to the outer surface of the tubular member 41, with the taperend end portion 56 preferably being of greater length than the tapered end portion 57.

The sleeve 55 is bodily mounted in spaced, concentric relation to the tubular member 41 by means of longitudinally spaced collars 58 suitably secured, as by welding, to the member 41 and formed with countersunk or tapered recesses 59 in their peripheries as shown in FIG. 7. The wall of the sleeve 55 has spaced openings 60 therein with the openings being circumferentially spaced to register with recesses 59. This arrangement permits the sleeve to be fixed on the member by weldment plugs 61, or like securing elements.

The tubular member 41 is equipped adjacent its end opposite the sleeve 49 with radially disposed fins 65 for supporting the member in spaced relation to the inner surface of the roll end portion 38. The tubular member 41 is also supported at the open end of the roll surface portion 40 within the hub 66 of a ring plate 67 attached to such open end by screws 68 (FIG. 8). The hub 66 and plate 67 are formed with circumferentially spaced, radial legs 69 therebtween to afford open areas 70. The hub 66 is also equipped with means for securing the tubular member 41 against endwise movement relative to the roll, as by a set screw 71 or the like.

Figure 2:
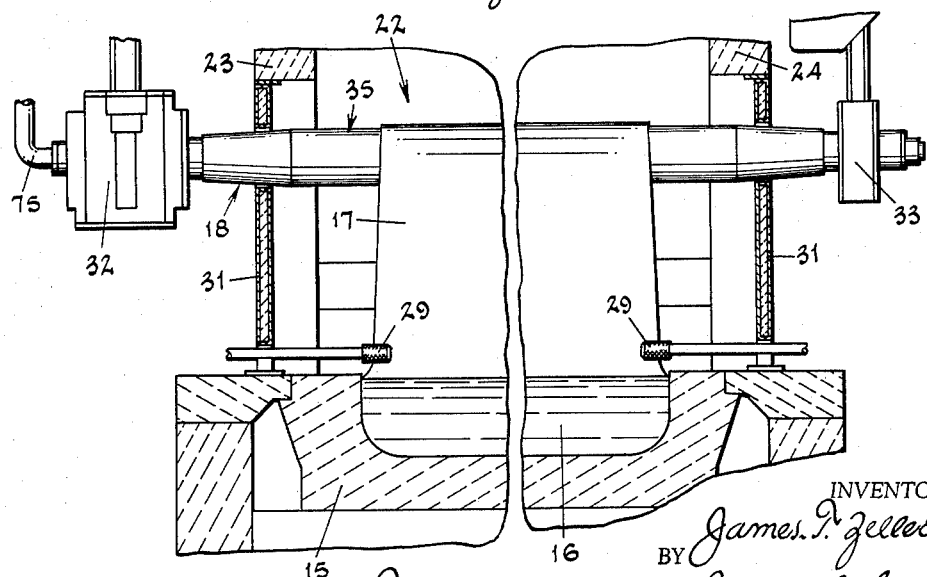
FIG. 2 is a transverse, vertical cross sectional view of the furnace.

In use, as viewed in FIG. 2, the end of an air supply pipe 75 is placed in the outwardly directed end of the sleeve 49. The air thus introduced, for example, at a constant pressure of two pounds per square inch at room temperature, is directed through the sleeve 49, between the spacing fins 48 toward the interior of the casing 35, and by means of the above structure and the conical end portion 47 of the plug 45, is directed axially into and through the chamber 76 created between the inner surface of the central cylindrical casing portion 36 and the outer surface of the sleeve 55.

Due to the gradually decreasing cross sectional area of the chamber 76 as defined by the tapered entrance end portion 56, the velocity of the air through the chamber is materially increased. This increase in velocity of the air will be maintained throughout its travel through the chamber 76 until reaching the exit end thereof defined by the tapered portion 57.

In addition, the temperature of the air progressively increases as it flows through the central cylindrical portion 36 of the casing due to the absorption of heat therefrom. However, the gradual expansion of the air and its increased rate of travel through the roll casing will result in a substantially uniform absorption of heat from the inner surface of the roll casing along its entire length. Another advantage resulting from the expansion of the air is that it causes a more thorough and uniform impingement of the air against the inner surface of the roll casing at the entrance end thereof and results in a "washing action" of all portions of the inner surface of the roll casing as it passes therethrough.

In this respect, the length of the tapered end portion 56 may be varied to equalize the cooling efficiency of the air throughout the chamber 76 according to the specific conditions encountered; that is, the length may be varied according to the temperature desired on the outer surface of the roll, the diameter and thickness of the roll, and the speed or r.p.m. of the roll, with a greater constant initial air pressure also being employed as the latter is increased.

The tapered portion 57 of the sleeve 55 is preferably of shorter length than the portion 56 due to the fact that it is desired to maintain the increased air flow velocity substantially to the exit end of the central cylindrical portion 36 of the roll casing. This is also of advantage in that it serves to decrease air turbulence at the exit end of the chamber 76 and effect a more rapid exhaust of the air from said chamber.

It is to be understod that the form of the invention herewith shown and described is to be taken as a preferred embodiment of the same, and that various changes in the shape, size and arrangement of parts may be resorted to without departing from the spirit of the invention.

I claim:

1. A roll for supporting a newly formed glass sheet, comprising an elongated hollow casing having a cylindrical central portion and tapered end portions, a tubular member supported concentrically within said casing and extending from one end thereof to a point adjacent the opposite end, means for closing said last-named end of the tubular member, a cylindrical sleeve surrounding said tubular member in spaced relation thereto and terminating at its opposite ends adjacent the ends of the cylindrical central portion of said casing to provide a chamber between said central casing portion and said sleeve, the opposite end portions of said sleeve being tapered and their extremities fixed to the outer surface of said tubular member to decrease the cross sectional area of said chamber inwardly of the tapered end portions of said sleeve, means for introducing air under a constant pressure into the end of said casing adjacent the closed end of the tubular member, and means for directing said air between said tubular member and the tapered end of said casing into and through said chamber.

2. A roll for supporting a newly formed glass sheet as claimed in claim 1, in which the tapered portion of the sleeve adjacent the air intake end of the roll is of greater length and at a more gradual inclination than that at the opposite end thereof.

3. A roll for supporting a newly formed glass sheet as claimed in claim 2, in which a second cylindrical sleeve having a diameter intermediate that of said central cylindrical casing portion and said tubular member is disposed within the roll and extends from the air intake end thereof past said tubular member end closing means, with said air introducing means projecting into said second sleeve.

References Cited by the Examiner
UNITED STATES PATENTS

| | | |
|---|---|---|
| 1,657,212 | 1/28 | Hitchcock. |
| 1,759,236 | 5/30 | Mambourg _____ 165—86 X |
| 2,214,874 | 9/40 | Bruno _____ 165—88 X |
| 2,531,988 | 11/50 | Price _____ 165—89 |
| 2,849,951 | 9/58 | Heinrich _____ 165—89 X |

FOREIGN PATENTS

| | | |
|---|---|---|
| 524,646 | 12/53 | Belgium. |
| 693,973 | 9/30 | France. |
| 596,018 | 7/59 | Italy. |

CHARLES SUKALO, *Primary Examiner.*

FREDERICK L. MATTESON, JR., *Examiner.*